(No Model.) 2 Sheets—Sheet 1.
W. C. BAKER.
STEAM TRAP.
No. 481,098. Patented Aug. 16, 1892.
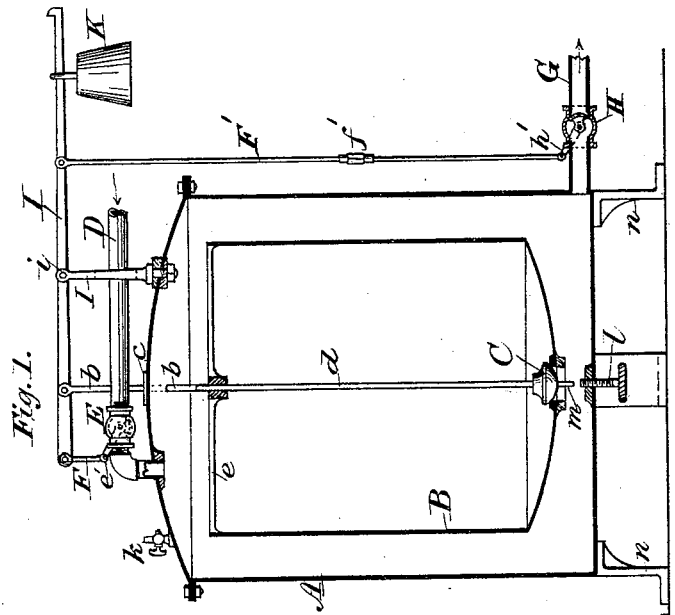
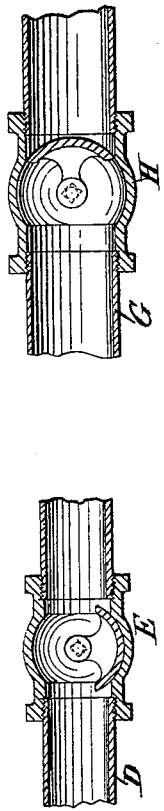
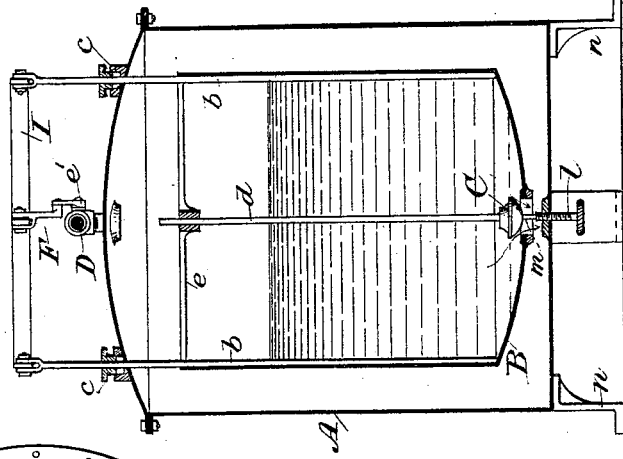
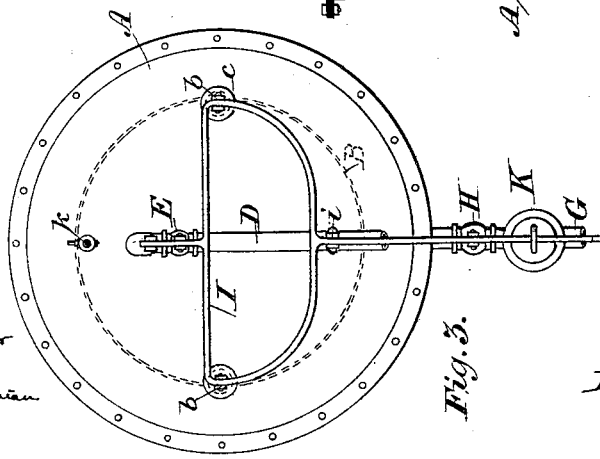
Witnesses:
Inventor:
William C. Baker,
By T. C. Brecht
Attorney.

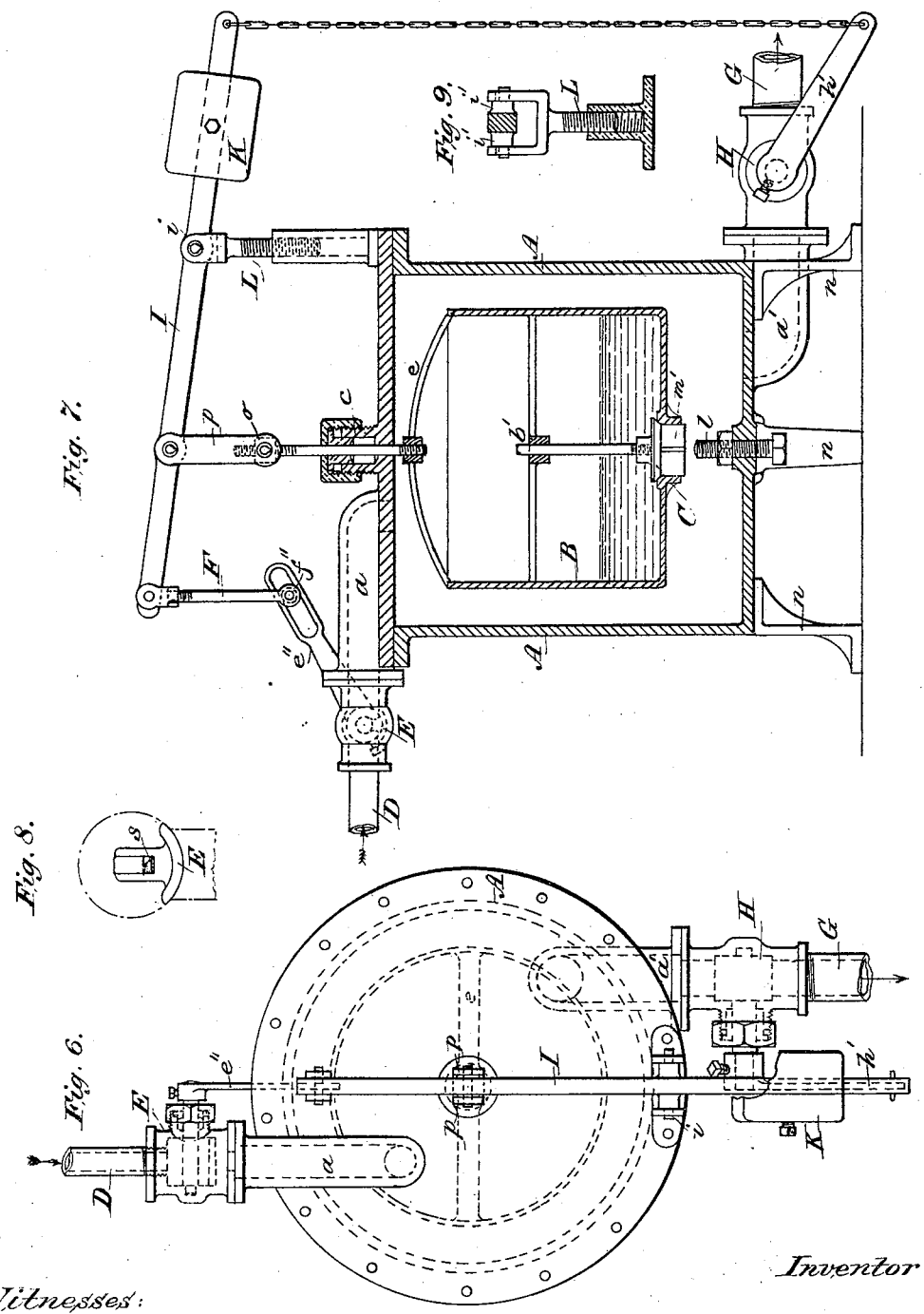

UNITED STATES PATENT OFFICE.

WILLIAM C. BAKER, OF BALTIMORE, MARYLAND.

STEAM-TRAP.

SPECIFICATION forming part of Letters Patent No. 481,098, dated August 16, 1892.

Application filed April 11, 1892. Serial No. 428,636. (No model.)

*To all whom it may concern:*

Be it known that I, WILLIAM C. BAKER, a citizen of the United States, residing at Baltimore, in the State of Maryland, have invented certain new and useful Improvements in Steam-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of steam-traps in which an open balanced bucket, placed in a closed vessel or cylinder, automatically operates a steam-inlet and a water-outlet valve by the rise and fall of said bucket and solely by the weight of the water of condensation accumulated in said bucket and without any pressure of steam, as is now usually the case with the traps in use.

The object of the invention is to produce a steam-trap that is reliable and automatic in its operation at all times; also that it will be regularly filled and emptied by the condensed steam which passes directly into an open bucket, and which by descending opens a valve in its bottom and allows the condense-water to escape; furthermore, to construct a very simple trap whose parts are not liable to get out of order and are easily accessible for repairs, and, finally, to produce a steam-trap at a reasonable expense.

My invention consists in the construction of certain details and combination of parts, as will be more fully described hereinafter, and specifically pointed out in the claims, reference being had to the accompanying drawings and the letters thereon.

Like letters indicate similar parts in the different figures of the drawings, in which—

Figure 1 represents a vertical section of my trap with the bucket raised and its valve closed for filling it. Fig. 2 is a similar view of the same with the bucket lowered, its valve open, and the condense-water escaping. Fig. 3 is a plan view of the same. Fig. 4 is a detail view of the steam-inlet valve, on an enlarged scale, in section. Sheet II is a modification. Fig. 5 is a similar view of the water-outlet valve.

In the accompanying drawings, A represents a closed vessel or receptacle of any suitable size and shape, according to the requirements, but preferably cylindrical and provided with convex top and flat bottom. It is made of cast or wrought iron, brass, or other suitable material. In the cylinder A is placed a bucket B, of such size that the steam admitted can pass entirely around it, to keep said bucket in equilibrium. The bucket B is provided with the guide-rods $b\,b$, which pass through the stuffing-boxes $c\,c$, care being taken not to pack them too tight, so that the guide-rods can pass freely up and down through said stuffing-boxes. A valve C, preferably with a convex or conical face, fits into a seat corresponding thereto and arranged at the bottom of said bucket B. Said valve C is provided with a stem $d$, passing through an eye in the spider $e$, secured to the top of the bucket.

The steam-inlet pipe D, secured to the top of the cylinder A, is provided with a valve E, which has preferably a large lap, so that its travel will be greater or longer and steam be admitted a shorter time. The valve-stem of this valve has a crank-arm $e'$ secured to it, which is connected by an eye to a short rod F and the lever I.

The outlet water-pipe G for the escape of the condensed water from the bucket is arranged at the bottom of the cylinder A and is provided with a similarly-constructed valve H, but with a small lap, and it serves to regulate the escape of the condensed water. This valve H has also a crank-arm $h'$ on the outer end of its stem and is connected to the lower end of a rod F', preferably provided with a turnbuckle $f'$, by which the movements of the water-valve H can be regulated to a nicety. The crank-arms of the steam and water valves must be placed at such an angle to each other that while the steam-valve is open the water-valve is closed, or vice versa.

The guide-rods $b\,b$ of the bucket are attached by suitable eyes to a curved or bent lever I, having a proper fulcrum I and pin $i$, and its outer end is provided with a weight K, which serves to counterbalance the bucket until it overbalances said weight K by the condense-water. The upper end of the rod F is connected by an eye to said lever I, and as it is moved up and down it alternately opens or closes said water-valve H; but, as stated, always in such manner that when the steam-valve is open the water-valve is closed, and vice versa. A pet-cock $k$ is arranged in the cylinder A to permit the escape of air contained therein.

In the bottom of the cylinder A is arranged a set or regulating-screw $l$, by which the opening of the valve C can be regulated, as desired—i. e., to open sooner or later. The valve C has a small projection $m$, and as this comes in contact with said screw $l$ the valve will be raised sooner or later, as desired.

In the modification shown in Sheet II, Fig. 6 represents a plan of the trap. Fig. 7 is a vertical section of the same. Fig. 8 is a detail view of the valve in cross-section. Fig. 9 is a detail view of the fulcrum for the lever.

In this case the vessel A is provided with the nozzles $a$, to which the inlet steam-pipe D is connected, and the nozzle $a'$ for the outlet-pipe H for the condense-water. These nozzles are preferably cast in their proper positions on the head and bottom. The valve E is operated by a crank-arm $e''$, having a slot in its outer end in which a friction-roller $f''$ on the end of the rod F operates to prevent friction. Instead of the two guide-rods $b$ only one rod $b'$ is employed, forming at the same time the valve-stem for the valve C of the ordinary winged V-valve. The fulcrum L is made adjustable and the pin $i$ is provided with knife-edges to make it more sensitive and also to prevent friction or sticking. The lever I is made straight and provided with bosses $i'$ to prevent vibrating. The rod $b'$ is provided with a screw-thread at its upper end, which passes through a cross-head $o$, arranged between the two links $p$, and the pins are also formed into knife-edges. Instead of the rod F', in this case I employ a chain F'', as the valve H will always follow the valve E in its action. The valves E and H are of the ordinary "Corliss" kind, and are provided with springs $s$ to compensate for the wearing of their faces.

Suitable legs or supports $n$ are secured to the bottom of the cylinder A to support it, if desired, although the trap may be directly attached to a boiler or in any other suitable manner.

The operation is as follows: The steam-pipe D is connected to the steam-space of the boiler or other source of supply and the water-pipe G with a feed-tank or other receptacle. The steam-valve being opened, the steam passes into the cylinder A and bucket and entirely surrounds it. When the steam is deprived of a sufficient amount of condense-water, which falls into the bucket, it overbalances the weight K on the lever I, the bucket will sink, open the valve C, and at the same time close the valve E and open the valve H, allowing the water to escape into said feed-tank until the operation is repeated. The lever may be made straight, if desired, and pass over the steam-pipe when it is arranged centrally, although it may be placed to one side of the center, and usually I prefer to use the curved lever, arranged as in the drawings, as it steadies the movements of the bucket.

As is well known to those skilled in the art and others using steam-traps, those now in general use and employing a float or a hollow vessel of any kind made of soapstone, metal, or other material, are operated or are caused to rise and fall by the water of condensation as it accumulates in the vessel in which the float is placed, and said water of condensation is forced out of said vessel by the pressure of steam on the water, while at the same time the valves are operated by steam. In my trap the open bucket is operated solely by the weight of the water of condensation, which must accumulate in the bucket in sufficient quantity to overbalance the weight K on the lever I. Said bucket at the same time operates the steam-inlet and the water-outlet valves, as well as its own valve, automatically, as it rises and falls in the cylinder, and irrespective of any pressure of steam to assist in the discharge of the water.

I am aware of the patents, No. 408,176, to Graebert, and No. 218,941 and No. 224,661, to Davis, and disclaim the construction therein shown; but,

Having thus described my invention, what I claim is—

1. The combination, in a steam-trap, of the cylinder A, containing a central bucket B, provided with a valve C and connected by guide-rods $b$ to a weighted lever I, fulcrumed at $i$, and operating rotating valves E and H positively and alternately, in the manner shown and set forth.

2. The combination of the cylinder A, containing the bucket B, provided with the valve C, acted on by the adjusting-screw $l$, in combination with the guide-rod $b$, connected to the fulcrumed lever I, operating the rotating valves E and H by means of the rods F and the rod F', provided with the turnbuckle $f$, all arranged as and for the purpose set forth.

In testimony whereof I affix my signature in presence of two witnesses.

WILLIAM C. BAKER.

Witnesses:
EUGENE WALLER,
SOLOMON I. ALMAN.